United States Patent

Hayes et al.

[11] Patent Number: 6,112,140
[45] Date of Patent: *Aug. 29, 2000

[54] FLIGHT MANAGEMENT SYSTEM PROVIDING FOR AUTOMATIC CONTROL DISPLAY UNIT BACKUP UTILIZING STRUCTURED DATA ROUTING

[75] Inventors: James D. Hayes, Redmond; Peter D. Gunn, Bellevue; Richard A. Herald, Lynnwood, all of Wash.

[73] Assignee: The Boeing Company, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/854,645

[22] Filed: May 12, 1997

Related U.S. Application Data

[60] Provisional application No. 60/017,874, May 14, 1996.

[51] Int. Cl.[7] .......................... G06F 11/00; G06F 12/08
[52] U.S. Cl. ........................ 701/14; 701/3; 244/75 R
[58] Field of Search ................... 701/3, 4, 11, 14, 701/23, 24, 29, 31, 34; 244/75 R, 76 R, 194; 700/4; 709/238

[56] References Cited

U.S. PATENT DOCUMENTS

| | | | |
|---|---|---|---|
| 4,101,958 | 7/1978 | Patterson et al. | 701/14 |
| 4,115,847 | 9/1978 | Osder et al. | 700/4 |
| 4,568,928 | 2/1986 | Bifemo | 345/5 |
| 4,622,667 | 11/1986 | Yount | 714/11 |
| 4,646,241 | 2/1987 | Ratchford et al. | 701/14 |
| 4,654,846 | 3/1987 | Goodwin et al. | 714/13 |
| 4,658,359 | 4/1987 | Palatucci et al. | 701/14 |
| 4,675,675 | 6/1987 | Corwin et al. | 340/945 |
| 4,729,102 | 3/1988 | Miller, Jr. et al. | 701/14 |
| 4,845,495 | 7/1989 | Bollard et al. | 340/973 |
| 4,916,612 | 4/1990 | Chin et al. | 701/3 |
| 4,943,919 | 7/1990 | Aslin et al. | 701/3 |
| 5,001,638 | 3/1991 | Zimmerman et al. | 701/14 |
| 5,019,980 | 5/1991 | Starr et al. | 701/35 |
| 5,161,158 | 11/1992 | Chakravarty et al. | 714/26 |
| 5,195,040 | 3/1993 | Goldsmith | 701/200 |
| 5,371,744 | 12/1994 | Campbell et al. | 709/238 |
| 5,457,634 | 10/1995 | Chakravarty | 701/3 |
| 5,550,736 | 8/1996 | Hay et al. | 701/3 |
| 5,572,620 | 11/1996 | Reilly et al. | 714/11 |

OTHER PUBLICATIONS

IEEE/AIAA 10th Digital Avionics Systems Conference, Oct. 14, 1991, pp. 482–486, XP000309289 H. Griguere: "Flight Management System Back–p Navigation for the A330/A340 Aircraft".

Proceedings of NAECON 1992, vol. 1, May 1992, pp. 233–240, XP000339583, P.R. Pukite et al.: "Expert System for Redundanc and Reconfiguration Management", see pp. 233–234, left–hand colulmn, line 37.

Scientific Honeyweller, vol. 11, No. 1, 1991, pp. 57–70, XP000289742, K. Hoyme et al.: "ARINC 629 and SAFE-bus: Data Buses for Commercial Aircraft".

*Primary Examiner*—Michael J. Zanelli
*Assistant Examiner*—Eric M. Gibson
*Attorney, Agent, or Firm*—James P. Hamley

[57] ABSTRACT

An improved aircraft flight management system includes a flight management computer (FMC), left and right control display units (CDU's) and a backup CDU. A triple redundant digital databus links the FMC and three CDU's. Upon detecting a failure in either the left or right CDU, the FMC utilizes reconfiguration rules stored in a look-up table to automatically cause the backup CDU to replace the failed CDU in operation, thereby relieving the flight crew of the burden of interfacing to the FMC through only one CDU. Upon detection of a failed databus, the system similarly utilizes structured data routing to reconfigure around the failed databuses. In addition, if any two CDU's have failed in a three CDU system, automatic data rerouting is implemented to the non-failed CDU to insure FMC to CDU communication.

12 Claims, 8 Drawing Sheets

Table 1    CDU/Bus Selection Matrix

| Rule Num | CDU L | | | CDU C | | | CDU R | | | Previous CDU C | Capt CDU | | FO CDU | |
|---|---|---|---|---|---|---|---|---|---|---|---|---|---|---|
| | LB | CB | RB | LB | CB | RB | LB | CB | RB | | CDU | Bus | CDU | Bus |
| 1. | V | X | X | X | X | X | X | X | V | X | LC | LB | RC | RB |
| 2. | V | X | X | X | X | X | X | V | I | X | LC | LB | RC | CB |
| 3. | V | I | I | X | I | V | X | I | I | X | LC | LB | CC | RB |
| 4. | V | X | X | X | I | V | I | I | I | X | LC | LB | CC | RB |
| 5. | V | I | I | X | V | X | X | I | I | X | LC | LB | CC | CB |
| 6. | V | X | X | X | V | X | I | I | I | X | LC | LB | CC | CB |
| 7. | V | I | I | X | I | I | X | I | I | X | LC | LB | -- | -- |
| 8. | V | I | V | I | I | I | I | I | I | X | LC | LB | -- | -- |
| 9. | V | X | X | I | I | I | I | I | I | X | LC | LB | -- | -- |
| 10. | I | I | V | X | X | X | V | I | X | X | LC | RB | RC | LB |
| 11. | V | I | V | X | X | X | V | I | I | X | LC | RB | RC | LB |
| 12. | I | I | V | X | X | X | X | V | X | X | LC | RB | RC | CB |
| 13. | I | V | V | X | X | X | I | V | I | X | LC | RB | RC | CB |
| 14. | I | I | V | V | I | X | I | I | X | X | LC | RB | CC | LB |
| 15. | V | I | V | V | I | I | I | I | I | X | LC | RB | CC | LB |
| 16. | I | I | V | X | V | X | I | I | X | X | LC | RB | CC | CB |
| 17. | I | V | V | X | V | I | I | I | I | X | LC | RB | CC | CB |
| 18. | I | I | V | I | I | X | I | I | X | X | LC | RB | -- | -- |
| 19. | I | V | X | X | X | X | V | X | I | X | LC | CB | RC | LB |
| 20. | V | V | X | X | X | X | V | I | I | X | LC | CB | RC | LB |
| 21. | I | V | X | X | X | X | X | X | V | X | LC | CB | RC | RB |
| 22. | I | V | I | V | X | I | I | X | I | X | LC | CB | CC | LB |

Fig. 5A

Table 1 continued    CDU/Bus Selection Matrix

| Rule Num | CDU L | | | CDU C | | | CDU R | | | Previous CDU C | Capt CDU | | FO CDU | |
|---|---|---|---|---|---|---|---|---|---|---|---|---|---|---|
| | LB | CB | RB | LB | CB | RB | LB | CB | RB | | CDU | Bus | CDU | Bus |
| 23. | X | V | X | V | I | I | I | I | I | X | LC | CB | CC | LB |
| 24. | I | V | I | X | X | V | I | X | I | X | LC | CB | CC | RB |
| 25. | I | V | V | X | X | V | I | I | I | X | LC | CB | CC | RB |
| 26. | I | V | I | I | X | I | I | X | I | X | LC | CB | -- | -- |
| 27. | I | V | V | I | I | I | I | I | I | X | LC | CB | -- | -- |
| 28. | I | I | I | V | X | X | X | X | V | X | CC | LB | RC | RB |
| 29. | I | I | I | V | X | X | X | V | I | X | CC | LB | RC | CB |
| 30. | I | I | I | V | X | X | I | I | I | C | CC | LB | -- | -- |
| 31. | I | I | I | I | I | V | V | I | X | X | CC | RB | RC | LB |
| 32. | I | I | I | V | I | V | V | I | I | X | CC | RB | RC | LB |
| 33. | I | I | I | I | I | V | X | V | X | X | CC | RB | RC | CB |
| 34. | I | I | I | I | V | V | I | V | I | X | CC | RB | RC | CB |
| 35. | I | I | I | I | I | V | I | I | I | C | CC | RB | -- | -- |
| 36. | I | I | I | I | V | X | V | X | I | X | CC | CB | RC | LB |
| 37. | I | I | I | V | V | X | V | I | I | X | CC | CB | RC | LB |
| 38. | I | I | I | I | V | X | X | X | V | X | CC | CB | RC | RB |
| 39. | I | I | I | I | V | X | I | I | I | C | CC | CB | -- | -- |
| 40. | I | I | I | X | I | I | V | I | I | X | -- | -- | RC | LB |

FIG. 5B

Table 1 continued  CDU/Bus Selection Matrix

| Rule Num | CDU L | | | CDU C | | | CDU R | | | Previous CDU C | Capt CDU | | FO CDU | |
|---|---|---|---|---|---|---|---|---|---|---|---|---|---|---|
| | LB | CB | RB | LB | CB | RB | LB | CB | RB | | CDU | Bus | CDU | Bus |
| 41. | I | I | I | I | I | I | X | X | V | X | -- | -- | RC | RB |
| 42. | I | I | I | I | I | V | I | I | V | X | -- | -- | RC | RB |
| 43. | I | I | I | I | I | I | X | V | I | X | -- | -- | RC | CB |
| 44. | I | I | I | I | V | I | I | V | I | X | -- | -- | RC | CB |
| 45. | I | I | I | V | I | I | I | I | I | F | -- | -- | CC | LB |
| 46. | I | I | I | X | X | V | I | I | I | F | -- | -- | CC | RB |
| 47. | I | I | I | X | V | I | I | I | I | F | -- | -- | CC | CB |
| 48. | I | I | I | I | I | I | I | I | I | X | -- | -- | -- | -- |

FIG. 5C

Transition:          Rule Pairs:
LR->LC BY RULE(S): 12->16  10->16  21->16  1->16  12->14  10->14  21->14  1->14...
LC->L-  BY RULE(S): 16->18  14->18  25->18  4->18  24->18  23->26  22->26  17->26...
LC->CR BY RULE(S): 24->33  3->31   16->38  5->36  24->34  14->28  22->29  24->29...
LC->C   BY RULE(S): 24->46  4->46  16->47  6->47  14->47  6->46   23->45  23->45...
LR->L-  BY RULE(S): 12->18  10->18  21->18  1->18  21->26  19->26  13->26  2->26...
LR->CR BY RULE(S): 12->33  2->33   21->33  1->33  10->31  19->31  21->31  1->31...
LR->R   BY RULE(S): 21->41  1->41  12->43  2->43  12->41  10->41  19->40  10->41...
L-->C-  BY RULE(S): 18->35  26->39  7->30
L-->-R  BY RULE(S): 18->41  26->43  7->40  18->42  26->44
CR->C-  BY RULE(S): 18->48  26->48  9->48
CR->>-R BY RULE(S): 33->35  31->35  38->39  36->39  34->39  28->30  29->30  32->30...
CR->-R  BY RULE(S): 38->41  28->41  33->43  29->43  33->41  31->40  36->40  31->41...
R-->C-  BY RULE(S): 42->35  44->39  40->39  40->30
C-->-  BY RULE(S): 35->48  39->48  30->48
-C->-  BY RULE(S): 46->48  47->48  45->48
-R->-  BY RULE(S): 41->48  43->48  40->48

FIG. 6

FLIGHT MANAGEMENT SYSTEM PROVIDING FOR AUTOMATIC CONTROL DISPLAY UNIT BACKUP UTILIZING STRUCTURED DATA ROUTING

CROSS-REFERENCES TO RELATED APPLICATIONS

This application is based on provisional application No. 60/017,784, filed May 14, 1996 and is entitled to all rights resulting therefrom.

BACKGROUND OF THE INVENTION

The present invention relates to the aircraft flight management art and, in particular, to an improved flight management system comprising redundant control display units (CDU's), redundant databuses and a flight management computer (FMC), which automatically responds to detected failures in CDU's or databuses to maintain an operating FMC-CDU interface.

In modern commercial aircraft, a flight crew makes flight plan entries and modifications through a Flight Management System comprising one or more flight management computers (FMC's) and, typically, left and right control display units (CDU's). The FMC's and CDU's are linked by redundant databases. These CDU's are positioned to be accessed by the pilots for purposes of flight plan data entries into the CDU's and then to the FMC's for implementation of a desired flight plan.

In some aircraft, a third CDU unit has been provided in the flight deck. However, such CDU's are provided to perform functions other than FMC interface. In the event that one of the primary left or right CDU's has failed, this leaves only one CDU remaining for the flight crew to perform FMC operations. Only one operating CDU results in reduced crew capability for dealing with flight management functions even though an additional CDU might be physically on board. Thus, loss of a CDU creates increasing work load for the pilot which has the remaining functional CDU. A second fault in a CDU or associated databus could result in the total loss of CDU control.

In addition, failure of one or more of the redundant databases can similarly result in reduced system capability.

In certain previous avionics designs, manually operated switches in the cockpit allow the flight crew to reconfigure the data path from the FMC to the CDU's. Given that the switching was simple, there were failure combinations that the crew could not correct, resulting in the loss of one or more CDU's to control the FMC.

In addition, it has not been practical to swap CDU's in flight. Maintenance has to be deferred until completion of the current flight leg.

SUMMARY OF THE INVENTION

It is an object of this invention, therefore, to provide an improved aircraft flight management system which, upon detection of a failed control display unit or databus, automatically reroutes the data to maintain an operating CDU.

These and other objects of the invention will become apparent upon review of the specification and the claims set forth below.

Briefly, according to the invention, an improvement is provided in an aircraft flight management system which includes at least one flight management computer (FMC), at least two control display units (CDU's) and at least two databuses permitting interfaces to the said at least one FMC from said CDU's. The improvement comprises logic control which is associated with the FMC. The logic control includes means for detecting the failure of one of said CDU's and/or databuses and, in response thereto, utilizing structured data routing to reroute signals over a non-failed databus to connect a non-failed CDU to the FMC.

In an aircraft flight management system which includes at least one flight management computer (FMC) left and right control display units (CDU's) permitting interfaces to the FMC from left and right pilot positions, respectively, and a third, backup CDU, an improved method for improving the backup CDU to automatically function in place of a failed left or right CDU comprises the steps of:

a) at least two databases linking the at least one FMC to the left, right and backup CDU's; and b) providing logic control, associated with at least one FMC, the logic control performing the steps of:
   i) detecting failure of one of the left and right CDU's and/or databases and, responsive thereto,
   ii) utilizing structured data routing to automatically reroute signals over a non-failed databus to the backup CDU such that the backup CDU is fully functional in place of the failed left or right CDU.

DESCRIPTION OF PREFERRED EMBODIMENT

Figure 1:
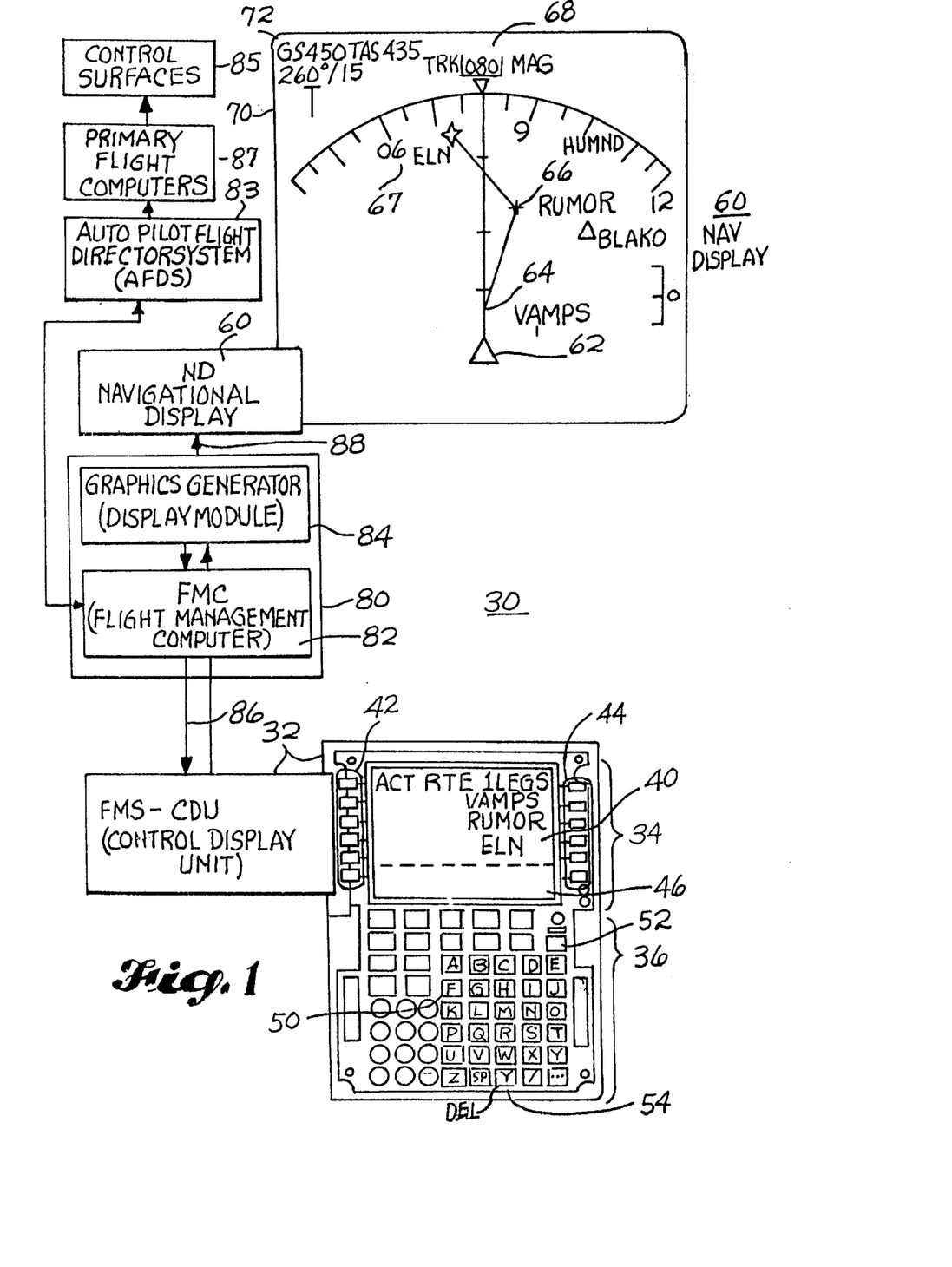
FIG. 1 is a diagram illustrating the general appearance and relative interconnection of the flight management system including the control display unit (CDU), databases, navigation display (MAP) and logic module.

FIG. 1 illustrates in both graphic and block diagram form the primary components of a modern commercial flight management system, indicated generally at 30. Shown at 32 is a conventional aircraft navigational Flight Management System-Control Display Unit (FMS-CDU). The FMS-CDU 32 includes an upper face portion 34 and a lower face portion 36. In its upper face portion 34, the FMS-CDU 32 includes an electronic display 40 which is capable of displaying lines of text entered by the flight crew. These lines of text depict, typically, waypoints along the path of a desired navigational route. On both sides of and adjacent to the electronic display 40 are line select keys, indicated generally at 42 and 44. Upon the user activating one of the line select keys 42, 44, the adjacent line of text on the electronic display is activated to thereby allow entry, selection or deletion of text.

At the lower portion of the electronic display is scratch pad line 46 which displays system generated messages, entries via the keyboard (described below) and data being moved from one line to another.

In the lower face half 36 of the FMS-CDU 32 is a keyboard, indicated generally at 50. The keyboard 50 includes an array of keys as well as control inputs by which the flight crew can manually enter waypoints, which then appear on the electronic display 40 as text line items. Also included are various control keys which allow the flight crew to add, modify, and delete various entries.

For example, a provided Execute key 52 is a momentary action push button which becomes illuminated to indicate a modification to the active route. Upon the flight crew pushing the Execute key 52, a desired modification is activated and illumination of the key is extinguished.

A provided Delete key 54 is a momentary action switch which, when activated by the flight crew, enters DELETE in the scratch pad portion 46 of the electronic display 40. When the scratch pad is blank, a selection of a subsequent line by line select keys 42, 44 deletes data on the corresponding adjacent line if such information is deletable.

Thus, by way of typed entries via the keypad 50, the flight crew enters waypoints along the desired navigational route. These waypoints are displayed as lines of text on the electronic display 40.

Also provided as a display to the flight crew of the desired navigational route is a navigational display (MAP) 60. The navigation display 60 depicts the current position of the aircraft, herein indicated by the triangle 62, at selected waypoints along the desired route such as the indicated waypoint "VAMPS" at 64, the next selected waypoint "RUMOR" at 66 and the final waypoint "ELN" at 67.

In addition to the route information also depicted on the navigation display 60 is the current magnetic track heading 68 and an arcuate line 70 which depicts a portion of a compass rose.

Also depicted in the upper left hand corner of the display 60 is information indicating the current ground speed, true air speed, wind speed and wind heading information, collectively shown at 72.

The navigation display 60 and FMS-CDU 32 interconnect through a logic module indicated generally at 80. The logic module 80 includes the flight management computer (FMC) 82. In addition, the logic includes the graphics generator (display module) 84. Inputs from the logic module 80 to and from the FMS-CDU 32 are carried along a multi-way bus 86, whereas display information from the graphics generator 84 is carried to the navigation display 60 via a one-way bus 88.

The flight management computer 82 provides lateral (LNAV) and vertical (VNAV) guidance signals to the autopilot flight director system (AFDS) 83, which validates and acknowledges the guidance signals. The AFDS 83 then provides guidance signals to the Primary Flight Computer (PFC) 87 which activates the aircraft's control surfaces 85 in the normal manner such that the aircraft is directed to automatically fly the route as selected by the flight management computer 62.

Figure 2:
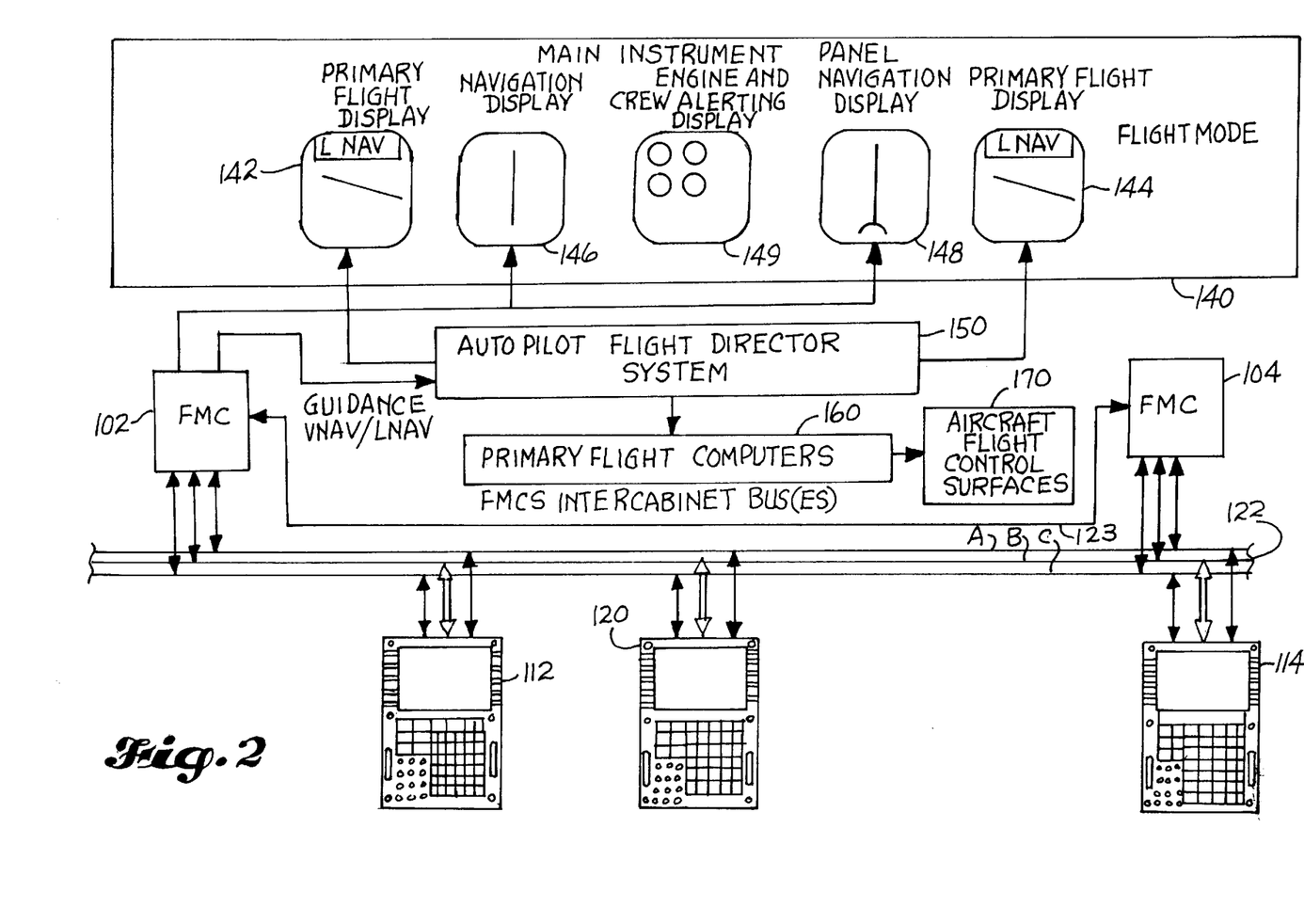
FIG. 2 depicts an aircraft main instrument panel and its interconnecting relationship to the flight management computers, autopilot flight director system, flight control computers, interconnecting digital databases and the three CDU's.

FIG. 2 illustrates a typical navigation arrangement as found in a modern commercial aircraft. Shown are left and right flight management computers (FMC's) 102, 104, respectively. The left and right FMC's 102, 104 communicate with associated left and right control display units (CDU's) 112, 114, respectively. The left and right CDU's 112, 114 are arranged for easy access by the pilots. As is often provided in modern commercial aircraft, a third, backup, or center channel CDU 120 is also provided. The third CDU 120 is used in some aircraft to interface to other aircraft systems such as satellite communications, SATCOM, and/or the public address/cabin interphone system (PACI).

The CDU's 112, 114 and 120 and FMC's 102, 104 communicate over a triple redundant data link or bus 122A, B, C. The two FMC's 102, 104 also communicate over an FMC's intercabinet bus 123, the function of which maintains synchronization of data states between the two FMC's 102, 104.

In normal operation, one of the two FMC's 102, 104 assumes primary control, here identified as left FMC 102. Thus, outputs from FMC 102 are provided both to the main instrument panel 140 and to an autopilot flight director system 150. The main instrument panel 140 includes left and right primary flight displays 142, 144, which are driven by left and right outputs from the autopilot flight director system 150. Left and right navigation displays 146, 148, respectively are driven by corresponding outputs from the primary FMC 102. A central engine and crew altering display 149 is also provided in the main instrument panel 140.

In the manner described with respect to FIG. 1, flight crew entries into the left and right CDU's 112, 114 of desired flight plans are then transferred to the FMC's 102, 104, with corresponding graphical depiction of the flight plans set forth on the left and right navigation displays 146, 148.

Output navigation guidance signals for both vertical navigation VNAV and lateral navigation LNAV are provided from the primary FMC 102 to the autopilot flight director system 150.

The autopilot flight director system 150 then produces corresponding output signals which pass to the primary flight computers 160. The primary flight computers 160, in turn, produce appropriate control signals which are applied to the aircraft's flight control surfaces 170 to cause the aircraft to fly in accordance with the flight crew entered flight plan in the CDU's 112, 114.

Prior to the present invention, if either of the left or right CDU's 112, 114 failed, there has been no means to cause backup CDU 120 to assume the function of the failed CDU. Swapping of the failed unit with a backup unit is normally a maintenance function which is not performed during flight operations. Thus, if either the left or right CDU 112, 114 fails, the pilot with the remaining operating CDU assumes an additional, burdensome workload. The present invention overcomes this limitation of the prior art systems by providing the capability for an FMC 102, 104 to automatically detect a failed CDU and operationally implement the backup CDU 120 to act in place of the failed unit.

In addition, the present invention is capable of detecting failure of one or more of the databuses 122A, B, C to reconfigure the connections between the FMC's 102, 104 to the CDU's 112, 114 and 120. Basically, if only one FMC 102, 104, one CDU 112, 114 and 120, and one of the three databuses 122A, B, C is operative, the present system will reconfigure to interconnect the operating units and provide CDU control of the FMC.

Figure 3:
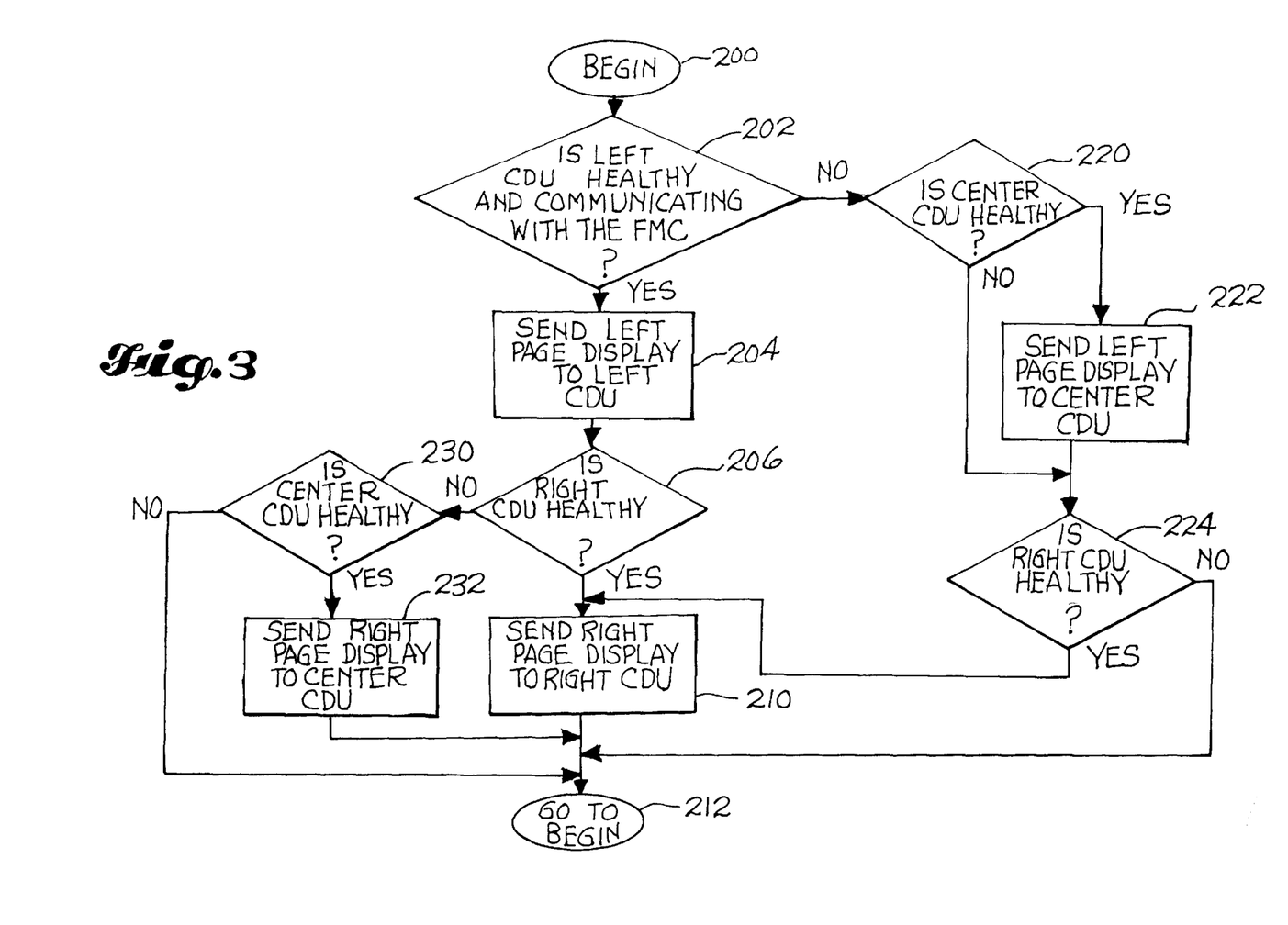
FIG. 3 is a logic flow diagram depicting the logical steps performed by the improved flight management system as shown in FIG. 2 in implementing CDU backup.

FIG. 3 is a logic flow diagram illustrating the logic steps performed by the primary FMC to automatically implement backup of a failed CDU. Here, the logic begins at block 200.

Then, at decision block 202, the system determines whether or not the left CDU (102 of FIG. 2) is healthy (i.e. operating properly, and properly communicating with the FMC). This determination includes review of a CDU generated status bit which indicates that the CDU is operating properly. Such communication takes place over digital database 122A, B, C as shown in FIG. 2.

If, out of decision block 202, the FMC logic determines that the left CDU is operating properly, block 204 is entered. In block 204, the FMC logic directs that the left page of the CDU display be sent to the properly operating, left CDU.

Then, at decision block 206, the FMC logic determines whether or not the right CDU is functioning properly. This, as before, requires the FMC to monitor the signals being applied to the digital databus by the right CDU to determine whether or not such signals indicate proper right CDU operation, including review of self check status bits which are generated by the right CDU.

If, out of decision block 206, it is determined that the right CDU is operating properly, the system then enters block 210. In block 21, the FMC logic causes the right page display to be sent to the right CDU. The system then reverts to 212 causing the logic to begin again at the begin stage 200.

If, at decision block 202, the FMC logic determines that the left CDU is not operating properly, decision block 220 is entered. At decision block 220, the FMC logic determines whether the center, or backup CDU (120 in FIG. 2) is operating properly. If the backup CDU is operating properly, the logic enters block 222. At block 222, the FMC logic now causes the left page display to be sent to the center, or backup CDU. As such, the backup CDU can now function in place of the failed CDU.

However, if at decision block 220 it is determined that the center, or backup CDU is not operating properly, the system enters a decision block 224. Decision block 224 is also entered out of block 222.

At decision block 224, the FMC logic determines whether or not the right CDU is functioning properly. If the right CDU is functioning properly, the logic enters block 210 and the right page display is then sent to the right CDU, with the system returning to the begin function 200 through intermediate step 212.

If, however, out of decision block 224 it is determined that the right CDU is not operating properly, the system returns to the begin position 200 through intermediate position 212.

Returning to decision block 206, if the FMC logic determines that the right CDU is not operating properly, a decision block 230 is entered. In decision block 230, the FMC logic determines whether or not the center, or backup CDU is healthy. If the center CDU is not healthy, the logic returns to the begin point 200 through intermediate point 212.

If, however, out of decision block 230 it is determined that the center CDU is operating properly, block 232 is entered. In block 232, the FMC logic causes the right page display to be sent to the center CDU, thereby causing the center CDU to assume the functionality of the failed right CDU. The system then returns to the begin point 200 through intermediate position 212.

Figure 4:
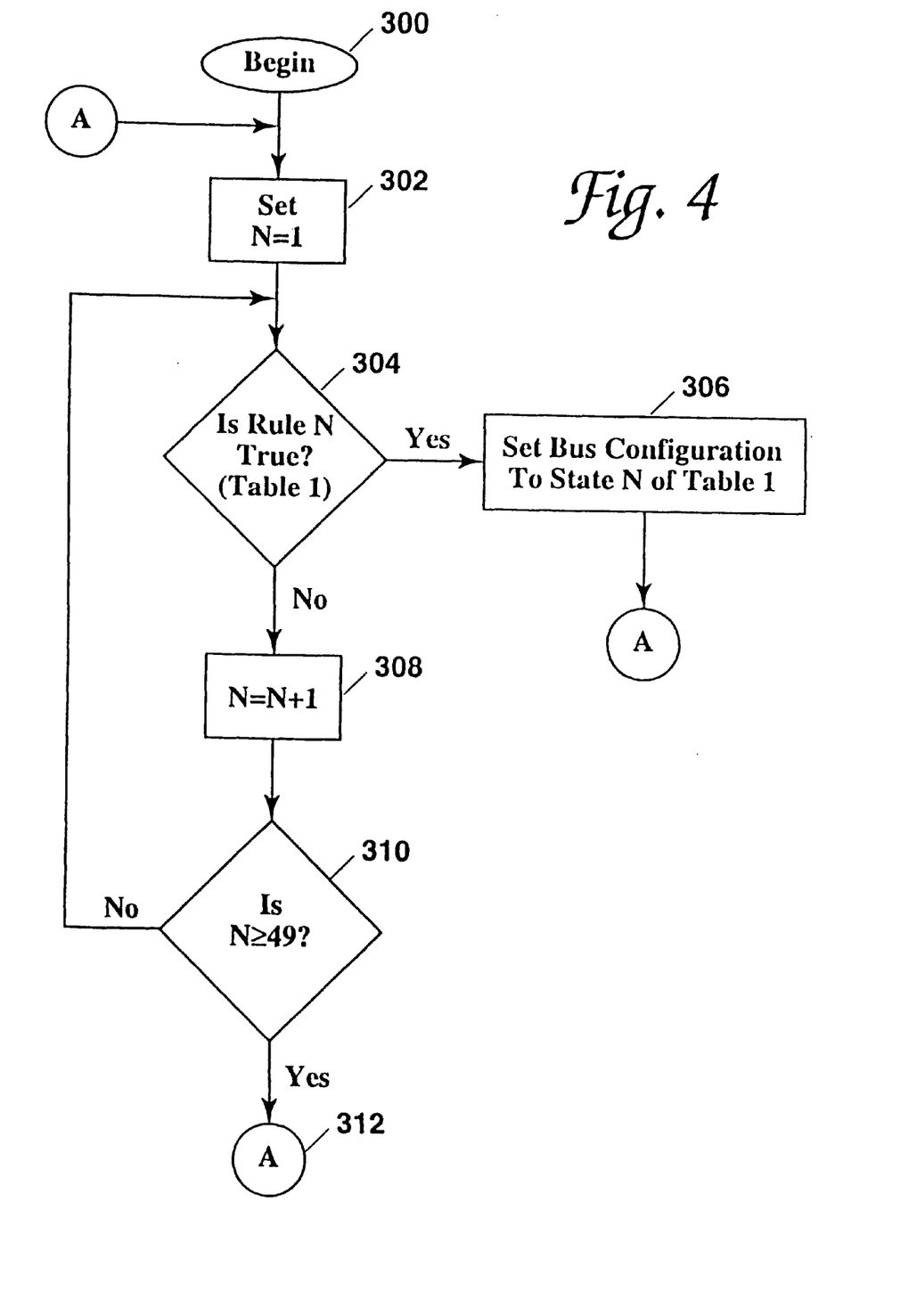
FIG. 4 is a logic flow diagram depicting the logical steps performed by the improved flight management system in utilizing structured data routing to implement CDU and databus backup.

FIG. 4 is a logic flow diagram depicting the sequence of logical steps performed by the improved flight management system to reconfigure the databus pathways to the operating control display units.

Figure 5A:
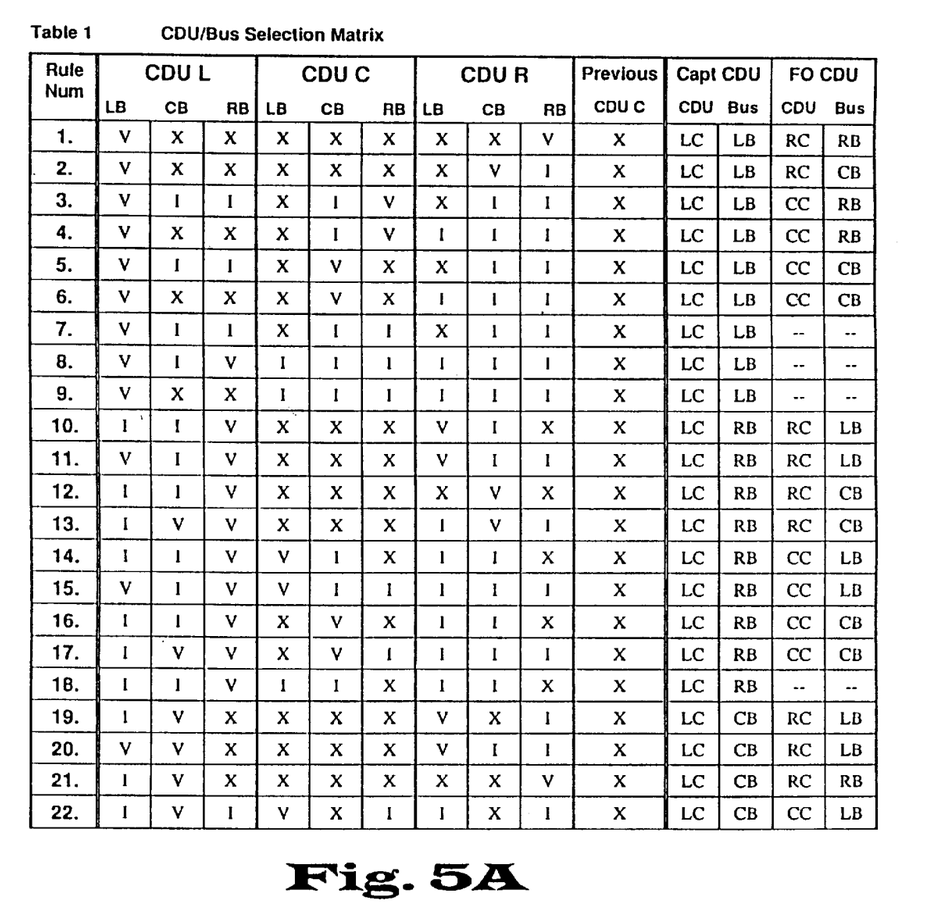
FIGS. 5A, 5B and 5C are tables depicting the CDU/Bus selection matrix in accordance with the preferred embodiment of the invention.
Figure 5B:
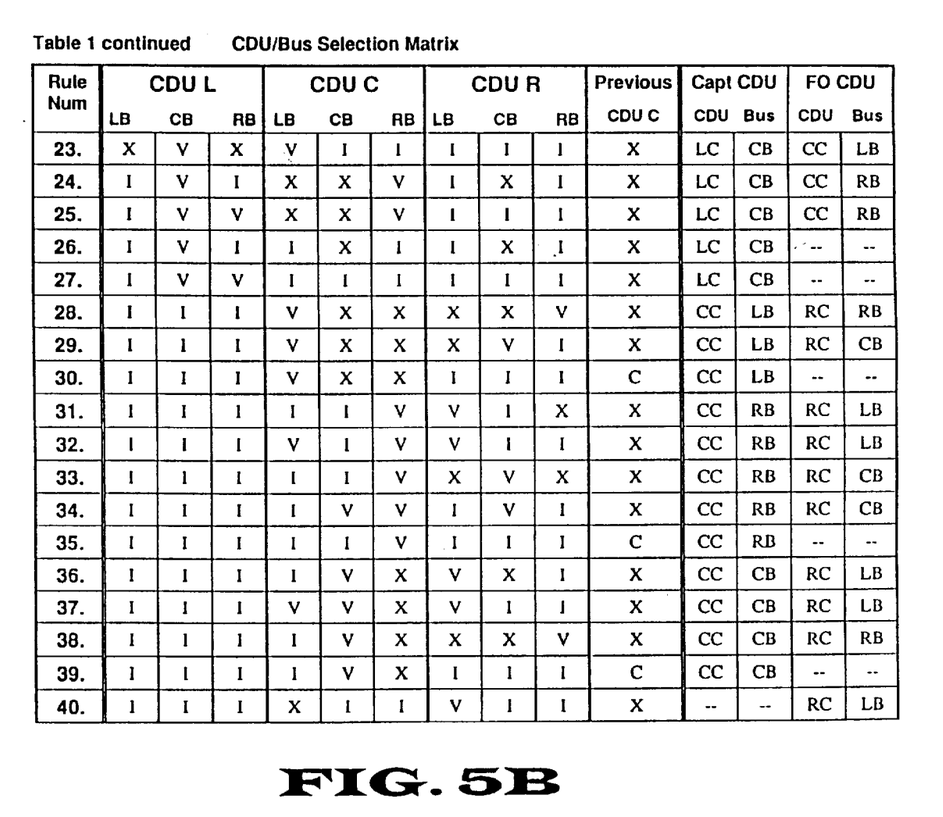
Figure 5C:
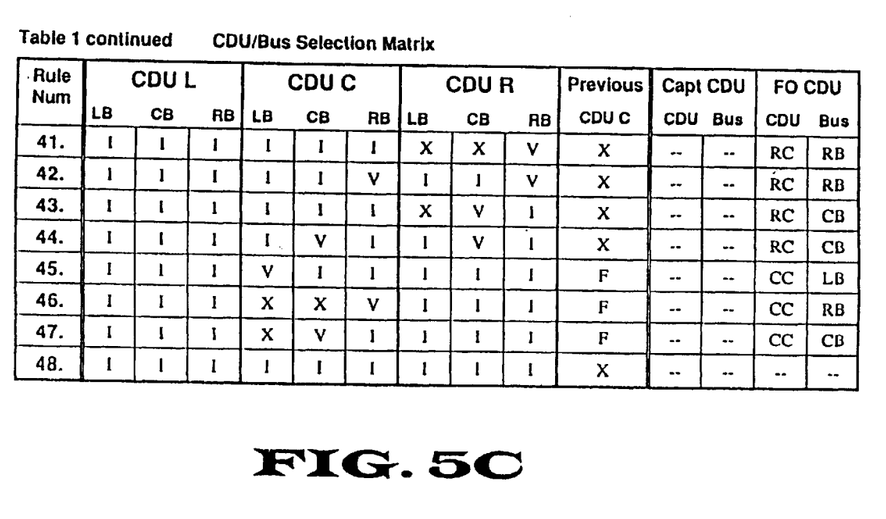

The system begins at 300 and proceeds to block 302 to set the rule value N=1. At decision block 304 the system determines whether the criteria set forth in rule No. N of table 1, set forth in FIGS. 5A, 5B and 5C are true. If all of the criteria for a particular rule of rule N are true, the system progresses to block 306 and reconfigures the bus configuration to the state N of table 1 as set forth in FIGS. 5A, 5B, and 5C.

If, however, out of decision block 304, the criteria for the rule N are not true, in block 308 the value of N is incremented by 1. Now, in decision block 310, if the value of N is greater than or equal to 49, since there are 48 different rules stated in table 1 set forth in FIGS. 5A, 5B and 5C, the system increments to step A at 312, returning to block 302 and resetting the value of N to 1. If, however, out of decision block 310 the value of N is not greater than or equal to 49, the system increments to decision block 304 to determine, once again, whether the rule N is true.

FIGS. 5A, 5B, and 5C indicate the CDU/Bus selection rules which determine the appropriate reconfiguration of the system to assure that one or more operating FMC's connect through one or more operating buses to one or more operating CDU's. The specific condition of the FMC's, buses and CDU's being valid or inoperable are herein referred to as "rules" in the table. Rules 1 through 47 maintain control by the FMC. Rule 48 is not necessary, but shows the state where there are no possible data paths.

Table 1, as set forth in FIGS. 5A, 5B and 5C is understood as follows. The three CDU columns indicate the validity of the specified CDU data on the specified bus where: V equals valid, I equals invalid, X equals don't care, LB equals left databus, CB equals center databus, and RB equals right databus. The data may be invalid either to a bus loss or due to failure of the specific CDU. The valid state indicates that the specified CDU's data is reaching the FMC over that databus.

The CDU's are required to maintain a periodic message over all three databuses to allow the FMC to determine allowable data paths. The column labeled Previous CDU_C indicates if CDU_C was last selected for the Capt CDU Display (C), FO CDU Display (F), or if the previous CDU_C is a Don't Care (X). If CDU_C was previously not selected and the state depends on the previous CDU_C selected, then Capt CDU Display shall be assumed.

The right-most columns indicate the target CDU (LC=CDU_L, CC=CDU_C, RC=CDU_R) and bus path (LB, CB, RB defined same as above) to be used for each of the Capt (Captain) and FO (First Officer) CDU Displays. The nomenclature—indicates that the CDU display is not available on any of the CDU's.

The table of FIGS. 5A, 5B and 5C defines the CDU selections and bus selections for all sets of failures in the system. The FIGS. 5A, 5B and 5C table is based upon three criteria:

1. For all sets of failure, where at least one path to one CDU exist, the valid CDU/BUS will be selected.

2. For all validity states where two CDU's are available over different bus paths, both CDU's will operate.

3. The selected set of CDU's should minimize the flight deck effect of failures.

Figure 6:
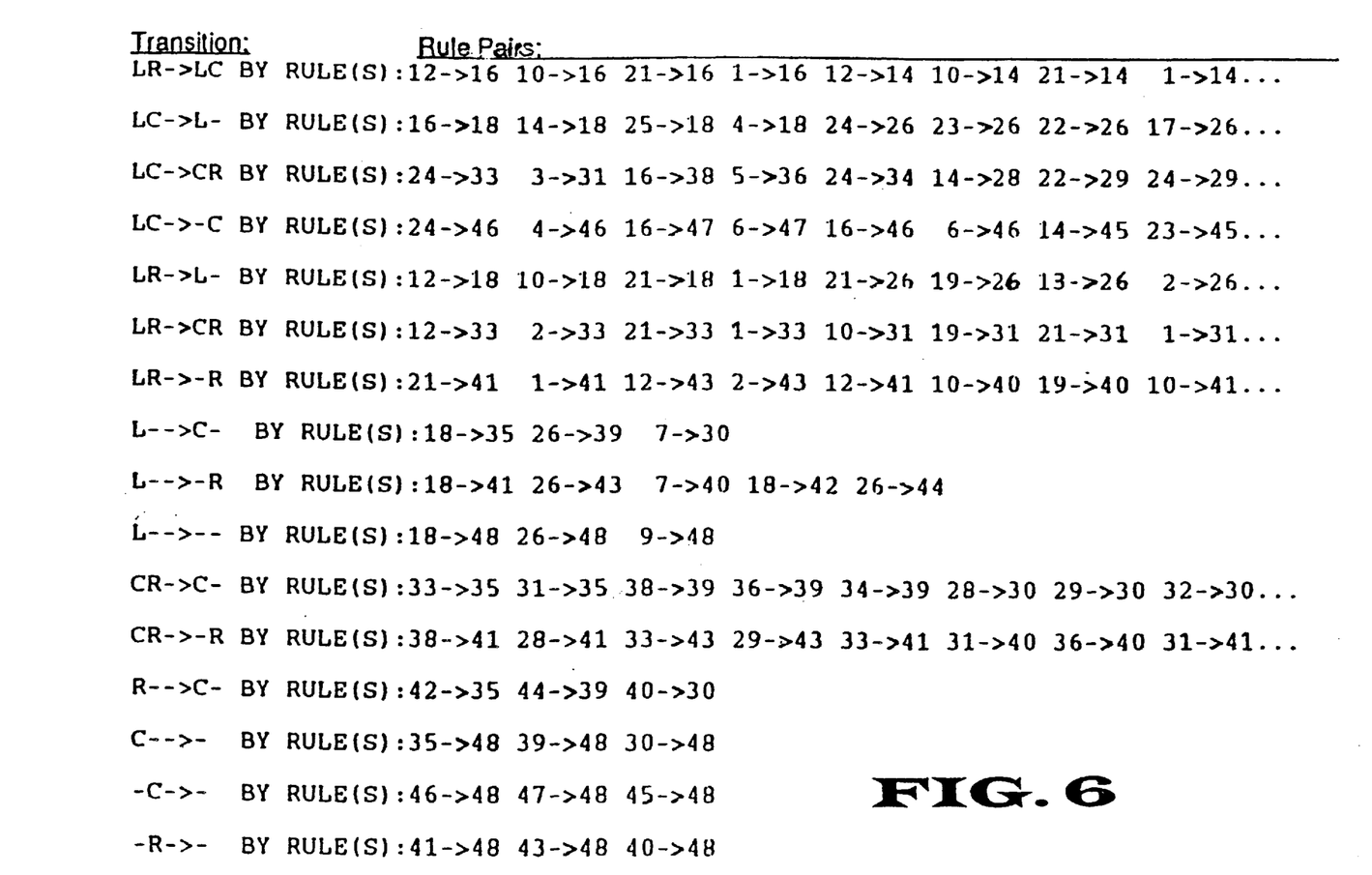
FIG. 6 is a table illustrating example CDU/Bus reconfigurations in accordance with the preferred embodiment of the invention.

To support the analysis of the third criteria above, the table of FIG. 6 summarizes CDU transitions which can occur as the result of a single failure using the reconfiguration rules set forth in the FIGS. 5A, 5B and 5C table and helps to illustrate the resultant flight deck effects. Although many reconfigurations may occur in the FIGS. 5A, 5B and 5C table, following the above three criteria, a flight deck effect will only occur when a transition in CDU interface to the FMC is generated. The transitions are listed as "12→34" where "1" indicates which CDU the Capt (Captain) was using, "3" which CDU is provided to the Captain as a result of the transition, "2" which CDU the FO (First Officer) was using, and "4" which CDU is provided to the FO as a result of the transition. Following each transition state, is a list of up to the first eight reconfiguration rule pairs (from the table of FIGS. 5A, 5B and 5C) which, when exercised, will result in the appearance of the transition (flight deck effect) identified in the left column. Where more than 8 rule pairs can cause an affect, '. . .' is listed. Note that the ordering of the rule pairs does not necessarily correspond to the order of the transition.

In summary, an improved aircraft flight management system has been described in detail. The improved system is capable of detecting failure of either the left or right control display unit to automatically activate a backup control display unit to assume the functionality of the failed unit. In addition, the system can detect and reconfigure around one or more failed databus(es).

While a preferred embodiment of the invention has been described in detail, it should be apparent that many modifications and variations thereto are possible, all of which fall within the true spirit and scope of the invention. For example, whereas the preferred embodiment of the invention utilizes a look-up table to store the reconfiguration rules, other approaches, such as coded logic, are clearly within the scope of the present invention.

What is claimed is:

1. In an aircraft flight management system including at least one flight management computer (FMC), at least two control display units (CDU's) and at least two databuses permitting interfaces to said CDU's from said FMC, the improvement comprising:

logic control means associated with said at least one FMC for:
      a) automatically detecting failure of one of said CDU's or one of said databuses and responsive thereto,
      b) utilizing structured data routing to predeterminedly reroute signals over a non-failed databus to connect a non-failed CDU to the FMC in a manner to minimize flight crew impact as a result of a failure, the rules for the structured data routing being set forth in a predetermined look-up table which includes a hierarchy of reconfiguration scenarios based on the possible failures of the CDU's or databuses.

2. The improvement of claim 1 wherein the aircraft flight management system includes a second FMC and said logic control means predetermined look-up table includes a hierarchy of reconfiguration scenarios based on the possible failures of the CDU's, databuses or FMC's.

3. An aircraft flight management system comprising:
   at least one flight management computer (FMC);
   left and right control display units (CDU's) permitting interfaces to said at least one FMC from left and right pilot positions, respectively;
   a third, backup CDU;
   at least two databuses linking said FMC to said left, right and backup CDU's; and
   logic control means associated with said at least one FMC for:
      a) automatically detecting failure of one of said left and right CDU's or one of said databuses and, responsive thereto,
      b) utilizing structured data routing to predeterminedly route appropriate signals over a non-failed databus means such that said third, backup CDU is fully functional in place of said failed left or right CDU in a manner to minimize flight crew impact as a result of a failure, the rules for the structured data routing being set forth in a predetermined look-up table which includes a hierarchy of reconfiguration scenarios based on the possible failures of the CDU's or databuses.

4. The system of claim 3 wherein the aircraft flight management system includes a second FMC and said logic control means predetermined look-up table includes a hierarchy of reconfiguration scenarios based on the possible failures of the CDU's, databuses or FMC's.

5. In an aircraft flight management system including at least one flight management computer (FMC), left and right control display units (CDU's) permitting interfaces to said at least one FMC from left and right pilot positions over two or more databuses, an improved method for automatically rerouting signals between the FMC and a non-failed CDU over a non-failed databus, the method comprising the steps of:

a) providing logic control means, associated with said at least one FMC, said logic control means performing the steps of:
      i) automatically detecting failure of one of said left and right CDU's or one of said databuses and, responsive thereto,
      ii) automatically rerouting signals over a non-failed databus to a non-failed CDU to the FMC in a manner to minimize flight crew impact as a result of a failure, the rules for the structured data routing being set forth in a predetermined look-up table which includes a hierarchy of reconfiguration scenarios based on the possible failures of the CDU's or databuses.

6. The improvement of claim 5 wherein the aircraft flight management system includes a second FMC and said logic control means predetermined look-up table includes a hierarchy of reconfiguration scenarios based on the possible failures of the CDU's, databuses or FMC's.

7. In an aircraft flight management system including at least one flight management computer (FMC), left and right control display units (CDU's) permitting interfaces to said at least one FMC from left and right pilot positions over multiple, redundant databuses respectively, the improvement comprising:
   a third backup CDU;
   redundant databuses linking said FMC to said left, right and backup CDU's; and
   logic control means associated with said at least one FMC for:
      a) automatically detecting failure of one of said left and right CDU's or one of said databuses and responsive thereto,
      b) utilizing structured data routing to route signals over a valid databus to cause said backup CDU to operate in place of said failed left or right CDU in a manner to minimize flight crew impact as a result of a failure, the rules for the structured data routing being set forth in a predetermined look-up table which includes a hierarchy of reconfiguration scenarios based on the possible failures of the CDU's or databuses.

8. The improvement of claim 7 wherein the aircraft flight management system includes a second FMC and said logic control means predetermined look-up table includes a hierarchy of reconfiguration scenarios based on the possible failures of the CDU's, databuses or FMC's.

9. An aircraft flight management system comprising:
   at least one flight management computer (FMC);
   left and right control display units (CDU's) permitting interfaces to said at least one FMC from left and right pilot positions, respectively;
   a third, backup CDU;
   multiple, redundant databuses linking said FMC to said left, right and backup CDU's; and
   logic control means associated with said at least one FMC for:
   a) automatically detecting failure of one of said left and right CDU's or one of said databuses and, responsive thereto,
   b) utilizing structured data routing to route appropriate signals over a non-failed databus means such that said third, backup CDU is fully functional in place of said failed left or right CDU in a manner to minimize flight crew impact as a result of a failure, the rules for the structured data routing being set forth in a predetermined look-up table which includes a hierarchy of reconfiguration scenarios based on the possible failures of the CDU's or databuses.

10. The system of claim 9 wherein the aircraft flight management system includes a second FMC and said logic control means predetermined look-up table includes a hierarchy of reconfiguration scenarios based on the possible failures of the CDU's, databuses or FMC's.

11. In an aircraft flight management system including at least one flight management computer (FMC), left and right control display units (CDU's) permitting interfaces over multiple, redundant databuses to said at least one FMC from left and right pilot positions, respectively, and a third, backup CDU, an improved method for permitting said backup CDU to automatically function in place of a failed left or right CDU or databus, the method comprising the steps of:
   a) linking said FMC to said left, right and backup CDU's via the multiple redundant databuses;
   b) providing logic control means, associated with at least one FMC, said logic control means performing the steps of:
      i) automatically detecting failure of one of said left and right CDU's or one of said databuses and, responsive thereto,
      ii) utilizing structured data routing to automatically route signals over a non-failed databus to said backup CDU such that said backup CDU is fully functional in place of said failed left or right CDU in a manner to minimize flight crew impact as a result of a failure, the rules for the structured data routing being set forth in a predetermined look-up table which includes a hierarchy of reconfiguration scenarios based on the possible failures of the CDU's or databuses.

12. The improvement of claim 11 wherein the aircraft flight management system includes a second FMC and said logic control means predetermined look-up table includes a hierarchy of reconfiguration scenarios based on the possible failures of the CDU's, databuses or FMC's.

* * * * *